Aug. 30, 1966    F. FERRARI    3,269,018
CONTINUOUSLY VARIABLE PROPORTIONAL SCALE
Filed June 22, 1964    2 Sheets-Sheet 1
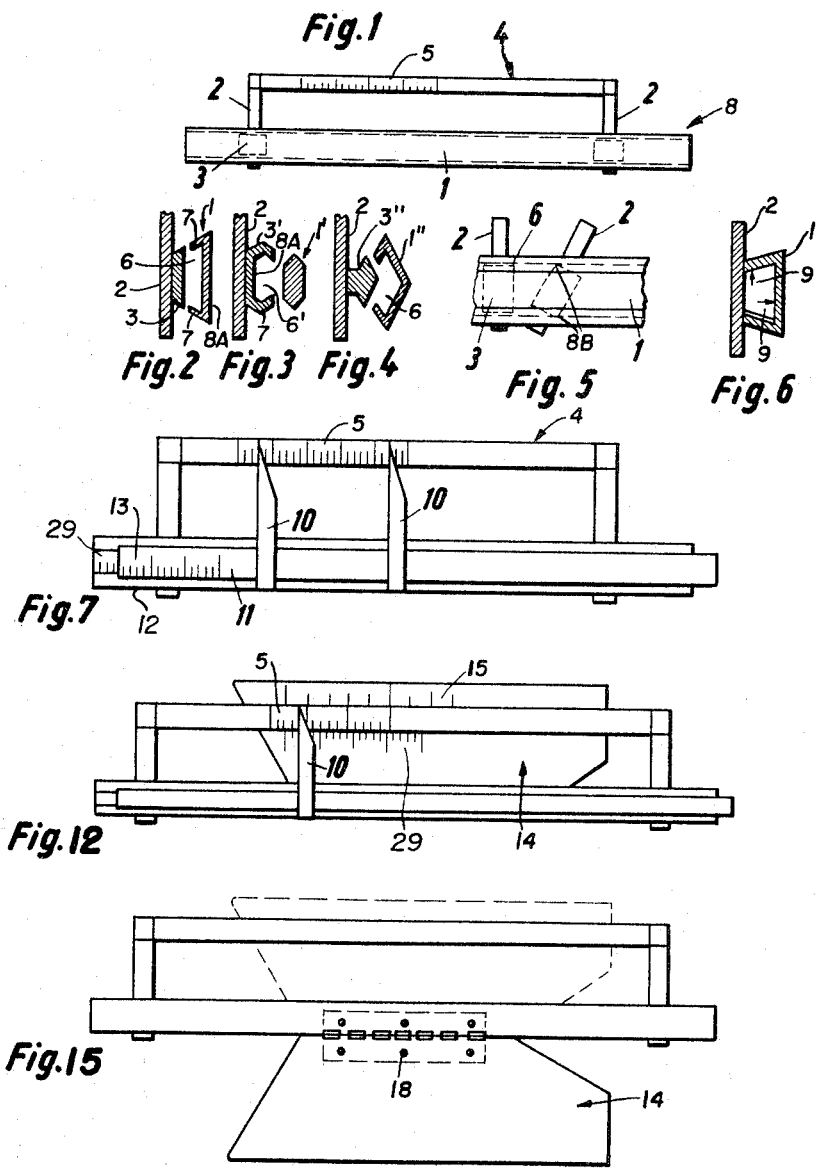
INVENTOR
Franz Ferrari
BY Spencer & Kaye
ATTORNEYS Aug. 30, 1966   F. FERRARI   3,269,018
CONTINUOUSLY VARIABLE PROPORTIONAL SCALE
Filed June 22, 1964   2 Sheets-Sheet 2

INVENTOR
Franz Ferrari

BY Spencer & Kaye
ATTORNEYS

United States Patent Office 3,269,018
Patented August 30, 1966

3,269,018
CONTINUOUSLY VARIABLE PROPORTIONAL
SCALE
Franz Ferrari, Sigismundkorso 19,
Berlin-Frohnau, Germany
Filed June 22, 1964, Ser. No. 377,016
Claims priority, application Germany, July 10, 1963, F 40,202; July 20, 1963, F 40,292; Aug. 3, 1963, F 40,-445; Aug. 17, 1963, F 40,626; Sept. 11, 1963, F 40,773; Sept. 30, 1963, F 40,890; Nov. 6, 1963, F 41,194; Apr. 9, 1964, F 42,320
15 Claims. (Cl. 33—137)

The present invention relates to a continuously variable proportional scale.

The objects of the invention are the provision of a continuously stretchable and contractable proportional scale and a combination proportional scale and slide-rule for performing elementary methematical operations, both instruments being of a novel and advantageous design.

Additional objects and advantages of the present invention will become apparent upon consideration of the following description when taken in conjunction with the accompanying drawings in which:

FIGURE 1 is a front view of one embodiment of the invention.

FIGURE 2 is an exploded sectional view of certain elements of FIGURE 1.

FIGURES 3 and 4 are exploded side views of modifications.

FIGURES 5 and 6 illustrate the "tilt" and "wedge" effects," respectively.

FIGURE 7 is a front view of one embodiment of a combination proportional scale and slide-rule.

FIGURE 12 is a front view of a modification of the embodiment of FIGURE 7.

FIGURE 15 is a front view of a modification of the embodiment of FIGURE 12.

Figure 8:
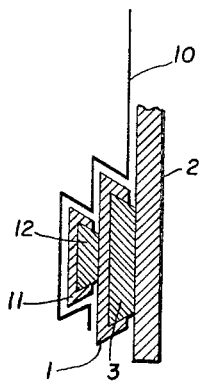
FIGURE 8 is a sectional view of the embodiment of FIGURE 7.

Referring to FIGURES 1 and 2, the invention, indicated generally by reference numeral 8, comprises a guide means or body 1, in the shape of a rectangular strip, two vertically projecting arms 2, and a band 4 of elastomeric material, supported at either end by one of the arms 2, and having thereon, whether by printing or any other suitable method, graduations, whereby a proportional scale 5, continuously—not stepwise—expandable or stretchable and contractible, is provided. As better seen in FIGURE 2, each of the arms 2 is provided at or near its other end with a slide means 3, for sliding in a groove 6 provided in one wall of the guide means 1, whereby each arm 2 is individually movable along the length of the guide means 1. The slide means 3 can be formed integrally with the arm 2 or manufactured separately and secured to the arm 2 in any desirable manner. As clearly shown in the embodiment of FIGURE 2, the side walls 7 of the groove 6 form acute internal angles with the bottom wall 8A of the guide means 1, thereby holding together the arms 2 and means 1. In accordance with one aspect of the invention, it is simply necessary that the side walls of the groove form an included acute angle with the vertical plane, as shown in FIGURES 2, 3 and 4. Or, stated more generally, the side walls must form an included acute angle with a plane passing through two parallel generatrices, one generatrix being in the plane of each of the side walls.

The use of two self-locking, independently movable arms 2 is a most advantageous novelty of the invention, permitting, as it does, an unusually rapid adjustment of the instrument, because both ends of the band 4 can be independently moved; whereas heretofore, such instruments having proportional scales had only one adjustment device, resulting in a slower manipulation of the instrument, because only one end of the scale could be adjusted.

FIGURES 3 and 4 illustrate two further embodiments, wherein in FIGURE 3 the slide means 3' is shaped so as to form a groove 6' for receiving the body 1' on which the arms 2 now slide, and FIGURE 4 represents a modified version of the embodiment of FIGURE 1. All of these embodiments have in common the feature of a groove possessing an acute included angle, as already defined, cooperating with a correspondingly shaped slide means (3 and 3") or body (1'), a particularly advantageous construction, as now will be explained.

Whereas in known instruments of this general kind several locking or holding means are necessary for the shifting or adjusting device in order to fix or hold the adjusted length of the proportional scale, it is possible with the novel construction of the invention to eliminate them. This results not only in a particularly simple operation of the instrument, but also in a substantial reduction in the required number of precision mechanical parts, which all other manually or self-operated locking or holding means would require.

In accordance with the invention, the locking of the bars 2 at any desired positions along the length of the guide means or body 1, 1', or 1" is obtained through the simultaneous action of two effects. In order that the arms 2 be freely movable along the length of the instrument 8, a certain amount of play is always provided between the means 3 (and its modifications) and the means 1. Referring to FIGURE 5, which, for the purpose of illustration, shows the tilt of an arm 2 greatly exaggerated, there thus arises as a natural consequence of the elastomeric band 4 being always to some degree stretched, a "tipping effect," acting in the plane of the band, the magnitude of which is the product of the force, exerted by the stretched band, times the lever arm through which the force acts. The result of this tipping effect is that diagonally opposite corners of the means 3 are brought to bear, at 8B, on respective walls of the grooves 6 (FIGURES 2 and 4) or on the body 1', securely holding the corresponding arm 2 in any desired position, along the length of the instrument.

This locking caused by the tipping effect is substantially strengthened by the second effect, properly called the "wedge" or "squeeze effect," acting by virtue of the acute included angles and occasioned by the first effect and acting perpendicular thereto. In the second effect, shown in FIGURE 6, the opposing walls of means 3 (3' and 3") and 1 (1' and 1") where they are in contact, are squeezed or wedged together by the force 9. The magnitudes of the two effects are directly proportional to the tension on the stretched band.

Although the tipping effect alone would suffice for holding the arms 2 in position, it has, because of the acute-angled cross section, already remarked upon, a particular significance. Since the instrument when put down or put away can be struck or knocked about, thereby jeopardizing the position of the setting or adjustment, it is important that the locking is also assured, in a second plane, against upwardly acting stresses. This provision is indispensable in a transportable instrument.

By slightly pivoting, in the plane of the instrument, the arms 2 toward the vertical, they are easily displaced. For coarse adjustment the arms are pivoted sufficiently to permit them to be quickly displaced, in one continuous movement, to a new position. Fine adjustments are made by rocking the arm, causing it to move in exceedingly small steps. Because each arm 2 is instantly self-locking when the operator lets go of it, there is never any danger that it will inadvertently snap back under the influence of the stretched band 4.

In accordance with the invention there is, of course, also the possibility of using the self-locking feature only for the coarse adjustment or movement, while providing for the fine adjustment a special shifting or adjusting means having its own locking arrangement.

The self-locking arrangement of the invention, the action of which on the shifting means is proportional to the stretch of the band 4, offers the advantage that it is now possible to stretch the band more than was possible with those arrangements lacking a self-locking means operated from the outside, because with the latter it was impossible, when using extensions of considerable magnitude, to avoid the snapping back of the scale band, before the locking arrangement could be actuated.

The possibility of increasing the stretching of the band offers a considerable improvement over the prior art, because the proportional scale on the band is useful over a substantially greater range than was the case when proportional scales were intended only for a small range—rather as reduction scales.

Whereas formerly the useful range for extensible bands was, in any case, in the ratio of 1:2, with the invention it is possible to obtain ratios of 1:5. This expansion of the useful range offers the additional advantage of securing the maximum accuracy. In accordance with the invention this is obtained by printing the scale, or otherwise giving the band a scale, when the band 4 is greatly extended. As a general rule, the scale is printed on the band when the latter is stretched to approximately the middle of its useful range. When the useful range extends from 4 to 20 centimeters, for example, the printing can be done with a stereotype plate 12 centimeters long, while the band is stretched to three times its normal length. It follows that the scale is most accurate when it is 12 centimeters long. Using homogeneous, uniformly graduated, elastomeric material for the band, a high accuracy is assured for lengths longer or shorter than the ideal—in fact, over the entire range, as, for example, the 12 centimeters given in the above instance.

It is often desired to transfer proportional scales directly to diagrams, pictures or objects, which, done by hand, would be most laborious. Because the invention assures a positive locking of the stretched scale, it is possible, for example, to undertake so-called percentualization, i.e., the reduction or enlargement of objects in a certain ratio, by printing, because the scales are raised from the plane of the band 4.

If a proportional scale having 100 divisions is laid alongside an inextensible scale, such that 100 divisions of the former mark off the first 64 divisions of the latter, then opposite 32 will be read 50%, opposite 16 the value 25%, etc.

Percentage being nothing more than multiplying, as, for example, by 0.5 and 0.25, one can take account of the placement of the decimal point and, using the same combination of the same two scales, also perform multiplication, as, for example, $64 \cdot 500 = 32{,}000$, or $64 \cdot 2.5 = 160$.

Having in mind the high accuracy afforded by the novel construction of the invention, and the fact that the proportional scale is quickly shifted or adjusted, by virtue of the two arms 2, the aforesaid inextensible scale is advantageously made a part of the instrument, as shown in the embodiment of FIGURE 7, wherein the inextensible scale 29 is on a rail 12 and graduations on this scale are transposed to those on band 4 by means of one or more pointers 10, which are associated with a transparent bar 11 movable laterally on the rail 12 of the means 1 and exhibiting, at 13, the scale 9. The arrangement of elements is clearly shown, for one embodiment, in FIGURE 8, corresponding to the embodiment of FIGURE 2. It will be appreciated, however, that, in accordance with the invention, the embodiments of FIGURES 3 and 4 are also applicable, as shown respectively at FIGURES 9 and 10, and that further modifications, as shown in FIGURE 11, for example, lie within the scope and spirit of the invention. In the latter figure, 12′, a modified form of element 12, includes a groove 13 that slidably receives the bar 11′ carrying the pointer 10 secured thereto at 19. In the embodiments of FIGURES 8 to 11 it will further be appreciated that it lies within the scope of the invention to manufacture certain of the elements of the invention, such as 1 and 12, or 1 and 12′, as separate parts, which are later joined together in any suitable manner, or as one integral part.

Figure 9:
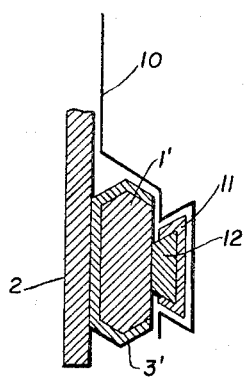
FIGURES 9, 10 and 11 are sectional views of several possible modifications.
Figure 10:
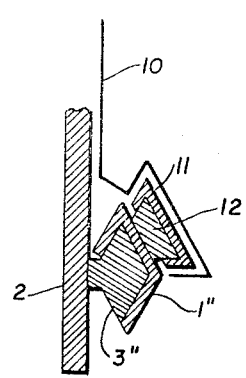
Figure 11:
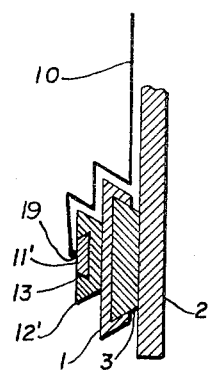

The pointer 10, in the embodiments exemplified in FIGURES 8 to 11, can be secured to the bar 11 or 11′ in any desired manner, such as by embedding or gluing or by manufacturing it as an integral part of the bar. Alternatively, at least part of the pointer can be made of a resilient material that is so shaped as to embrace the bar 11 in a snug and secure fit, as shown in FIGURES 8 to 10. It will be appreciated that pointer 10 can be an indicator of any desired shape and construction, for performing the role of a cursor, and is not limited to the particular pointer shown.

The embodiments shown in FIGURES 8 to 11 form a slide-rule for multiplying and dividing, employing for the first time linear scales and performing these elementary mathematical operations logically and clearly.

The proportional scale, as intended for a slide-rule, can be further perfected, such that the transposition of a graduation from the inextensible scale to the extensible scale, or vice versa, is no longer done by means of a pointer. In accordance with the invention (see FIGURE 12), the scale 29 is on a plate 14 that slides in the same groove 6 or on the same body 1′ that the bars 2 do, but independently of the bars.

Thus, the scale or scales on the band 4 and the scale or scales on plate 14 are brought into immediate proximity to each other. The pointer 10 now serves only to indicate and hold the computing point, as in the case with the cursor of a logarithmic slide-rule.

The plate 14 has a second, upper scale 15, which is on an expanded scale, for use when the proportional scale is contracted and the divisions of scale 12 are no longer useful.

Figure 13:
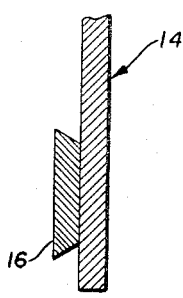
FIGURES 13 and 14 are sectional views of the plates 14 and associated means.
Figure 14:
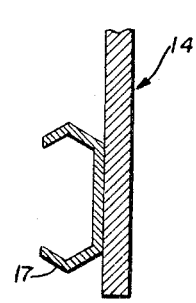

The proportional scale and the proportional slide-rule, combined as set forth above, can be used either to measure or to compute. Thus, when measuring, the scale plate 14 is so constructed that it can be removed, as shown in FIGURES 13 and 14, where, in FIGURE 13, the member 16 is adapted to engage and slide in the groove 6 and, in FIGURE 14, the member 17 accepts and slides on the body 1′. The elements 16 and 17 can, as part of the invention, be integral with the plate 14.

Figure 16:
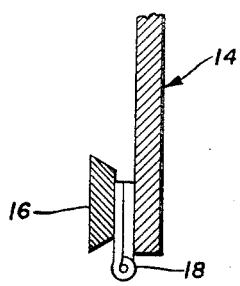
FIGURE 16 is a sectional view of the hinge arrangement.

When measuring, and not computing, the necessity for removing the plate 14 can be obviated, as shown in FIGURE 15, by using a hinge 18, whereby the plate 14 can be swung down out of the way, leaving the proportional scale 5 unencumbered and free to be set against or put on any surface as desired. As shown in FIGURE 16, the hinge is located between the member 16 (or 17) and the plate 14.

In addition to the many advantages of the invention described above, it should further be noted that the profiles of which the scale is made may inexpensively be extruded from metal or synthetic plastic.

It will be understood that the above description of the present invention is susceptible to various modifications, changes and adaptations, and the same are intended to be comprehended within the meaning and range of equivalents of the appended claims.

What is claimed is:

1. In an instrument of the kind described having a continuously variable proportional scale and defining a plane; a continuously stretchable and contractable elastomeric scale means having first and second ends; first means associated with said first end and second means associated with said second end for independently varying continuously the stretch and contraction of said scale, said first and second means being independently self-locking by a self-locking action under the influence of the elastomeric property of said scale means, said self-locking action securing said first and said second means against stresses in said plane and normal thereto; wherein said elastomeric scale means exerts a force on said first and second means such that the secureness of said self-locking action varies directly with the force exerted by said elastomeric scale means when it is stretched, whereby the more said scale means is stretched, and the greater the force it exerts to return itself to an unstretched state, the more firmly and securely it is held and locked in its stretched state; an elongated third means; each of said first and second means including fourth means for holding said first and second means in independent, longitudinal sliding association with said third means; at least one second scale associated with said instrument; said elastomeric scale means carrying at least one set of graduations comprising at least one first scale; and at least one sixth means, slidably associated with said instrument, for bringing the graduations of said at least one first and second scales into cooperative association for performing multiplication and division.

2. The instrument of claim 1, including guide means associated with said third means, for guiding said sixth means in its sliding path.

3. The instrument of claim 2, wherein said guide means has a track means and includes seventh means for sliding on said track means and carrying said sixth means.

4. The instrument of claim 2, wherein said guide means has a groove and includes eighth means for sliding in said groove and carrying said sixth means.

5. In an instrument of the kind described having a continuously variable proportional scale and defining a plane: a continuously stretchable and contractable elastomeric scale means having first and second ends; first means associated with said first end and second means associated with said second end for independently varying continuously the stretch and contraction of said scale, said first and second means being independently self-locking by a self-locking action under the influence of the elastomeric property of said scale means, said self-locking action securing said first and said second means against stresses in said plane and normal thereto; wherein said elastomeric scale means exerts a force on said first and second means such that the secureness of said self-locking action varies directly with the force exerted by said elastomeric scale means when it is stretched, whereby the more said scale means is stretched, and the greater the force it exerts to return itself to an unstretched state, the more firmly and securely it is held and locked in its stretched state; an elongated third means including groove means; each of said first and second means including fourth means constituted by first and second slide means respectively associated with said first and second means and sliding in said groove means for holding said first and second means in independent, longitudinal sliding association with said third means; a free space provided between said groove means and said first and second slide means; said first and second means including respective first and second arm means respectively associated at their one ends with said first and second ends of said scale means and at their other ends with respective ones of said first and second slide means; whereby said force acting on said first and second arms, which serve as lever arms, and causing said arms to tip to the extent permitted by said free space, causes diagonally opposite portions of said first and second slide means to engage and wedge with said groove means to produce a positive self-locking action on said first and second arms; at least one second scale associated with said instrument; said elastomeric scale means carrying at least one set of graduations comprising at least one first scale; and at least one sixth means, slidably associated with said instrument, for bringing the graduations of said at least one first and second scales into cooperative association for performing multiplication and division.

6. In an instrument of the kind described having a continuously variable proportional scale and defining a plane: a continuously stretchable and contractable elastomeric scale means having first and second ends; first means associated with said first end and second means associated with said second end for independently varying continuously the stretch and contraction of said scale, said first and second means being independently self-locking by a self-locking action under the influence of the elastomeric property of said scale means, said self-locking action securing said first and said second means against stresses in said plane and normal thereto; wherein said elastomeric scale means exerts a force on said first and second means such that the secureness of said self-locking action varies directly with the force exerted by said elastomeric scale means when it is stretched, whereby the more said scale means is stretched, and the greater the force it exerts to return itself to an unstretched state, the more firmly and securely it is held and locked in its stretched state; and elongated third means; each of said first and second means including fourth means for holding said first and second means in independent, longitudinal sliding association with said third means, said fourth means being constituted by first and second slide means respectively associated with said first and second means and each having a groove for receiving said third means for sliding thereon; a free space provided between said groove and said third means; said first and second means including respective first and second arm means respectively associated at their one ends with said first and second ends of said scale means and at their other ends with respective ones of said first and second slide means; whereby said force, acting on said first and second arms, which serve as lever arms, and causing said arms to tip to the extent permitted by said free space, causes diagonally opposite portions of said first and second slide means to engage and wedge with said third means to produce a positive self-locking action on said first and second arms; at least one second scale associated with said instrument; said elastomeric scale means carrying at least one set of graduations comprising at least one first scale; and at least one sixth means, slidably associated with said instrument, for bringing the graduations of said at least one first and second scales into cooperative association for performing multiplication and division.

7. In an instrument of the kind described having a continuously variable proportional scale and defining a plane; a continuously stretchable and contractable elastomeric scale means having first and second ends; first means associated with said first end and second means associated with said second end for independently varying continuously the stretch and contraction of said scale, said first and second means being independently self-locking by a self-locking action under the influence of the elastomeric property of said scale means, said self-locking action securing said first and said second means against stresses in said plane and normal thereto; wherein said elastomeric scale means exerts a force on said first and second means such that the secureness of said self-locking action varies directly with the force exerted by said elastomeric scale means when it is stretched, whereby the more said scale means is stretched, and the greater the force it exerts to return itself to an unstretched state, the more firmly and securely it is held and locked in its stretched state; an elongated third means; each of said first and second means including fourth means for holding said first and second means in independent, longitudinal sliding association with said third means; plate means removable from said instrument and slidably associated therewith, and carrying at least one third scale in immediate physical proximity to said at least one first scale, whereby the graduations of said at least one first and third scales are cooperatively associated for multiplication and division without the need of a cursor.

8. The instrument of claim 7, including means for pivotally mounting said plate means on said instrument, for pivoting said plate means free of said at least one first scale, whereby the latter can be placed in direct contact with a surface.

9. A continuously variable proportional scale instrument comprising, in combination:
 (a) elongated support and guide means;
 (b) two arms disposed transversely to said support and guide means, with each end of each of said arms extending beyond a respective side of said support and guide means;
 (c) at least one extensible, resilient band whose length is variable over a continuous range, said band having graduations therealong which define a first scale which is substantially parallel to the length of said support and guide means, each end of said band being connected to one end of a respective one of said arms; and
 (d) means defining at least one slider and at least one groove mounted between said support and guide means and an intermediate point of each of said arms, said at least one groove having at least a bottom wall and two side walls and said slider being disposed in said at least one groove and having a pair of side edges which are spaced apart by a distance which is slightly less than the corresponding dimension of said at least one groove for enabling each of said arms to slide freely independently of the other along the length of said support and guide means when said arm is placed in such a position that the portion of said means defining a slider and a groove associated therewith has its said slider side edges arranged substantially parallel to said groove side walls and for causing each of said arms to individually be automatically locked in position at any point along said support and guide means when, under the sole influence of the force applied to said arm by said band when the latter is under tension, said arm is placed in such a position that the portion of said means defining a slider and a groove associated therewith has its said slider side edges tilted relative to said groove side walls to bring one end of each of said side edges into frictional holding contact with said groove side walls.

10. An arrangement as defined in claim 9 wherein said means defining at least one slider and at least one groove includes a longitudinal groove formed in said support and guide means and two sliders each rigidly connected to a respective one of said arms at an intermediate point thereof.

11. An arrangement as defined in claim 10 wherein said two side walls each forms an acute internal angle with said bottom wall.

12. An arrangement as defined in claim 11 wherein each of said sliders has a cross-section which is similar to, and slightly smaller than, the cross-section of said groove.

13. An arrangement as defined in claim 9 further comprising: scale means carrying a second, non-extensible scale disposed parallel to said first scale; and additional slide means slidably disposed in said groove and supporting said scale means.

14. An arrangement as defined in claim 13 further comprising a hinge connected between said additional slide means and said scale means for pivoting said scale means about an axis substantially parallel to the length of said guide means.

15. An arrangement as defined in claim 9 wherein said means defining at least one slider and at least one groove includes a longitudinal slider formed on said support and guide means, and two slide members, one for each of said arms, each rigidly connected to a respective one of said arms at an intermediate point thereof and each having one of said grooves formed therein.

References Cited by the Examiner

UNITED STATES PATENTS

| | | | |
|---|---|---|---|
| 120,621 | 11/1871 | Chassaing | 33—137 |
| 398,851 | 3/1889 | Schultze-Berge | 33—19 |
| 766,605 | 8/1904 | Dilg | 248—246 |
| 768,929 | 8/1904 | Breese | 248—246 |
| 2,190,472 | 2/1940 | Ferrughelli | 235—70.3 |
| 2,512,184 | 6/1950 | Suydam | 33—137 X |
| 2,871,567 | 2/1959 | Casten | 33—192 X |

FOREIGN PATENTS

| | | |
|---|---|---|
| 1,197,532 | 12/1959 | France. |
| 284,569 | 6/1913 | Germany. |

LEONARD FORMAN, *Primary Examiner.*

ROBERT B. HULL, *Examiner.*

B. A. DONAHUE, *Assistant Examiner.*